Jan. 26, 1971   F. H. POOK   3,558,380
METHOD OF MANUFACTURING IMPREGNATED FIBRE
MATERIAL IN SHEET FORM
Filed Aug. 8, 1968   3 Sheets-Sheet 2
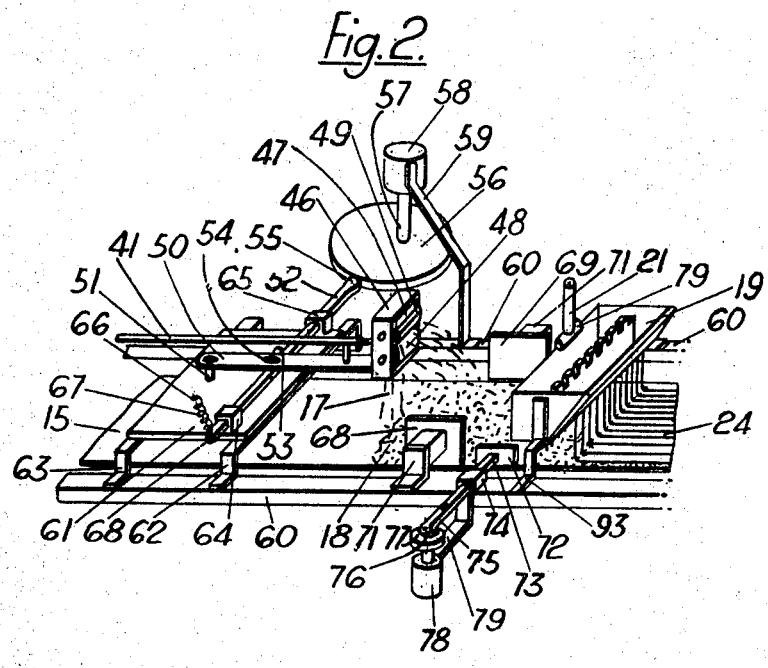
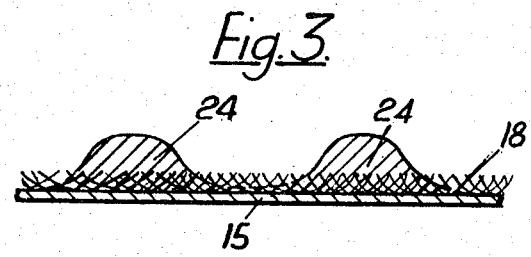
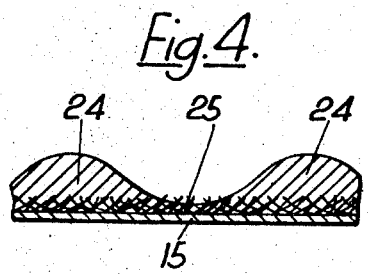
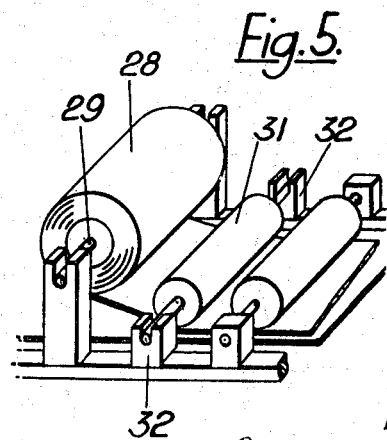
Inventor
Francis Harold Pook
By
Morrison, Kennedy & Campbell
Attorneys Jan. 26, 1971  F. H. POOK  3,558,380
METHOD OF MANUFACTURING IMPREGNATED FIBRE
MATERIAL IN SHEET FORM
Filed Aug. 8, 1968  3 Sheets-Sheet 3

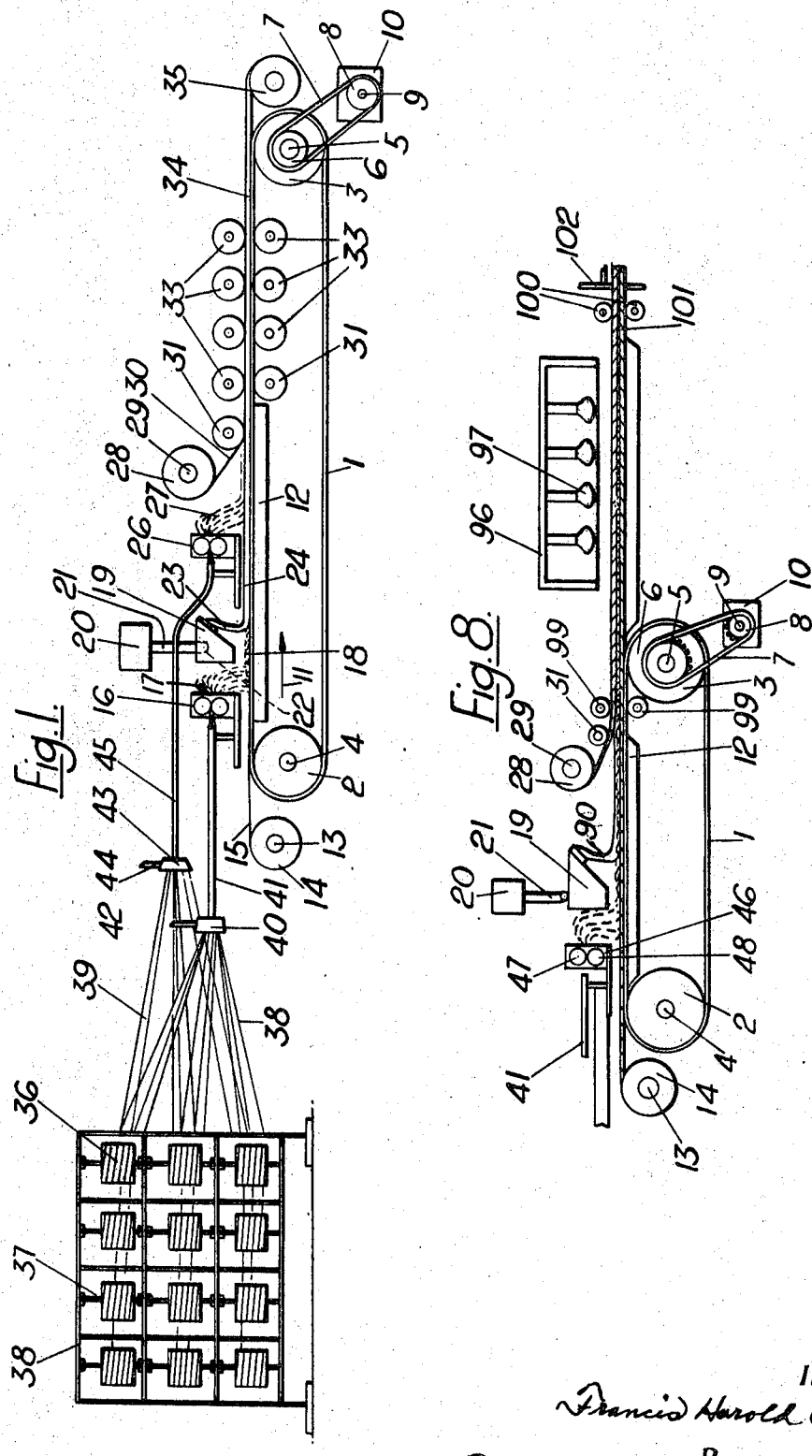

Inventor
Francis Harold Pook
By
Morrison, Kennedy & Campbell
Attorneys

United States Patent Office 3,558,380
Patented Jan. 26, 1971

3,558,380
METHOD OF MANUFACTURING IMPREGNATED FIBRE MATERIAL IN SHEET FORM
Francis Harold Pook, Sale, England, assignor to Fibreglass Limited, Liverpool, Lancashire, England, a corporation of Great Britain
Filed Aug. 8, 1968, Ser. No. 751,180
Claims priority, application Great Britain, Aug. 10, 1967, 36,732/67
Int. Cl. D21j 1/08; B29j 5/02
U.S. Cl. 156—62.2
10 Claims

ABSTRACT OF THE DISCLOSURE

A layer of reinforcing fibres is impregnated with flowable bonding material by forming spaced strips of the bonding material on the layer which sink individually through the layer and spread at the bottom of the layer to unite the strips before the bonding material completely impregnates the layer.

BACKGROUND OF THE INVENTION

This invention relates to the manufacture of impregnated fibre material of the kind in which a layer of reinforcing fibres is impregnated with a flowable bonding material.

The impregnated layer so formed may pass to a curing stage where the bonding material is cured to form fibre reinforced sheet material. Alternatively the bonding material impregnating the fibres may be a slurry of a resin of the kind which undergoes a gradual ripening to give a flexible material which can be handled and stored although the resin remains uncured and which can as required be moulded under heat and pressure in a conventional manner to produce a fibre reinforced moulding. This avoids the necessity for the customer making up his own resin for application to a fibrous mat.

Glass fibres are commonly employed as the fibre content of such materials although for some applications other reinforcing fibres such as mineral fibres or asbestos fibres may be employed.

It is a main object of the present invention to provide an improved impregnated fibre material, more especially an improved impregnated glass fibre material for subsequent processing to produce glass fibre reinforced material.

A further object of the invention is to provide an improved method of manufacturing impregnated glass fibre material in which a higher proportion of sheared strands of glass fibres are embodied in the material than has been possible hitherto.

SUMMARY

According to the invention, in a method of manufacturing an impregnated fibre material in sheet form there are provided the steps of uniformly distributing reinforcing fibres over a supporting surface to form a layer of fibres on the surface, forming spaced bodies of flowable bonding material on the layer, the spacing between which bodies is sufficient to ensure that the material in each body flows individually downwardly through the layer and that the bodies are united by lateral flow at the bottom of the layer, and then causing the bonding material to flow through the fibres between the bodies to complete the impregnation of the layer.

The sinking of the flowable bonding material individually from the bodies through the layer followed by lateral flow at the bottom of the layer to cause the bodies to unite means that air can escape from the layer of fibres during the flow of the bonding material into the fibres and when the final step is effected of causing the bonding material to flow through the fibres between the bodies then air entrapped in the fibres between the bodies is expelled by the flowing bonding material and the resulting impregnating layer is substantially free from entrapped air.

The process of the invention may be carried out for the production of individual sheets of impregnated fibre material for subsequent processing for example, for immediate curing to form fibre reinforced material, but the invention is particularly concerned with the continuous manufacture of impregnated fibre material in sheet form.

From this aspect the invention provides in a method of continuously manufacturing an impregnated fibre material in sheet form, the steps of uniformly distributing reinforcing fibres over a travelling film to form a layer on the film, channelling individual streams of flowable and mouldable bonding material on to the lay so as to deposit a plurality of strips of bonding material on the layer, which strips are spaced apart by a distance sufficient to ensure that the material of each strip sinks individually through the forwardly travelling layer and then spreads through the bottom of the layer to unite the strips, and subsequently causing the bonding material to permeate through the fibres between the strips to complete the impregnation of the layer.

The channelling of individual streams of flowable and mouldable bonding material on to the layer results in the production of the plurality of substantially parallel vermiform strips of bonding material on the layer and the bonding material from these strips sink individually through the layer during the continued advance of the layer on its travelling film and when the strip have been united at the bottom of the layer the layer on its film can be subjected to further treatment to cause the bonding material to permeate through the whole of the fibres between the strips.

A preferred method according to the invention is concerned with the continuous manufacture of impregnated glass fiibre material in sheet form for moulding under heat and pressure and this method according to the invention comprises uniformly distributing on a travelling film a layer of glass fibres, channelling individual streams of mouldable and flowable bonding material on to the layer of glass fibres so as to deposit a plurality of strips of the bonding material on the layer, which strips are spaced apart by a distance sufficient to ensure that the material of each strip sinks individually through the forwardly travelling layer and then spreads through the bottom of the layer to unite the strips, and subsequently causing the bonding material to rise between the strips to complete the impregnation of the glass fibre layer.

The glass fibres which are distributed on the travelling film may be in the form of continuous strands of glass fibres which are distributed rapidly over the travelling film so as to form a substantially uniform layer of glass fibres. The layer of glass fibres may also be formed by the collection on the travelling film of falling short fibres produced from a rotary head mounted above the path of the travelling film and which is supplied with molten glass.

Preferably glass fibres are uniformly distributed over the travelling film by strewing sheared strands of glass fibres over the film.

In order to increase the density of glass fibres in the impregnated product, the glass fibre content of the material may be supplemented by uniformly distributing further glass fibres on the initial layer when the strips of bonding material have united across the bottom of the layer, and causing the bonding material to complete the impregnation of the whole depth of the glass fibres. That is when the bonding material is caused to impregnate the fibres between the strips it additionally impregnates the supplementary glass fibres which have been deposited on top of the layer.

The strewing of sheared strands of glass fibres as mentioned above is the preferred way of producing the required uniform distribution of glass fibres and the glass fibre strands which are subjected to shearing may be derived by collecting fibres attenuated as they emerge from the nipples of a bushing and which may be treated with a size to prevent abrasion as is well known in the art, or the strands to be sheared may be taken from a creel of cakes of wound strands of glass fibres. In either case the strands of glass fibres are naked strands in contradistinction to glass fibres which are compacted and subjected to binding by a suitable binding agent to form a glass fibre mat.

The completion of impregnation of the layer of glass fibres is preferably effected by applying progressively increasing roller pressure to the layer of glass fibres to cause the bonding material to permeate through the fibres. This progressively increasing roller pressure causes the rising of the bonding material through the fibres between the strips of bonding material which have sunk downwardly through the fibres.

Preferably a covering film is continuously rolled onto the top surface of the impregnated fibre material. This travelling film is desirably applied to the top surface by the first rollers applying the roller pressure. These rollers may be resiliently mounted so as to avoid any initial damage to the glass fibres in the layer and the arrangement of feed of the covering film is such that it is gradually pressed downwardly onto the top surface of the layer so that it pushes down any fibres projecting from the upper surface of the layer without breaking those fibres.

In addition to causing the permeation of the bonding material through the fibre layer the roller pressure improves the uniformity of distribution of the fibres in the impregnated layer.

For the manufacture of a material which is to be stored and handled although uncured the bonding material is preferably a homogeneous resin slurry containing a livering agent and the impregnation of the fibres is complete before adverse thickening of the slurry occurs. The livering agent reacts with the resin in a manner to cause thickening of the slurry so that a gradual ripening of the impregnated layer takes place to give a flexible material with a surface which is not tacky and has the appearance of leather and has a good shelf life. This material flows easily in subsequent moulding under heat and pressure and obviates the necessity for the application of any resin in a moulding operation so that it can be supplied to a moulder who does not have to mix any resin.

Further according to the invention the bonding material may be a flowable thermosetting resin and when impregnation of the glass fibres is complete the glass fibre impregnated material is cured during its further travel to form a glass fibre reinforced sheet material. This material may be a flat sheet material or may be moulded during its further travel for example in the manufacture of corrugated glass fibre reinforced material.

The invention also comprehends an impregnated glass fibre sheet material suitable for moulding under heat and pressure, produced by a method as set out above, comprising from 2.4 ounces per square foot of glass fibres uniformly distributed through a thickened resin slurry. Further the invention comprehends a glass fibre reinforced moulded article produced by applying heat and moulding pressure to a piece of that impregnated sheet material.

Further, the invention provides apparatus for manufacturing impregnated fibre material in sheet form comprising a flat bed for supporting a film material, means for continuously advancing the film, means for feeding reinforcing fibres continuously towards the bed and for uniformly distributing the fibres over the advancing film, a hopper disposed transversely of the path of the film over the bed, means for feeding a mouldable and flowable bonding material to the hopper, a plurality of spaced outlets from the hopper adapted to channel individual streams of the bonding material on to the fibrous layer, and roller means mounted relatively to the bed and spaced from the hopper in the direction of advance of the film so as to apply pressure to the layer of fibres when the strips of bonding material have united at the bottom of the fibrous layer to cause the bonding material to rise through the fibres between the strips.

In a preferred apparatus according to the invention there is included means for feeding strands of glass fibres to strand shearing means located over the flat bed, said shearing means being disposed with respect to the bed to strew a uniform layer of sheared glass fibre strands over the advancing film, and film feeding means associated with said roller means for progressively covering the layer of fibres and bonding material with a covering film, the roller means being adapted to apply pressure to the fibre layer through the covering film.

In one embodiment of the invention for increasing the density of the glass fibre content of the material the apparatus includes a second strand shearing means located over the flat bed between the hopper and the roller means, and means for feeding strands of glass fibres to a second shearing means which is operable to strew further glass fibres over the initial layer carried on the film, prior to the rolling of the layer.

Preferably the strands of glass fibres to be sheared are taken from a creel of wound cakes, and the strands are guided through air ducts as they are advanced towards the shearing means.

In the preferred embodiment of the invention the individual streams of the bonding material which fall on to the layer of glass fibres to form the strips of bonding material on the fibres are channeled from a series of outlets from the hopper constituted by a series of flumes operatively associated with the hopper.

BRIEF DESCRIPTION OF THE DRAWINGS

FIG. 1 is a diagrammatic side elevation of apparatus according to the invention for manufacturing resin impregnated glass fibre material, illustrated by way of example, FIG. 2 is a pictorial view of part of the apparatus of FIG. 1 for shearing glass fibre strands to form a layer and depositing strips of resin slurry on the layer, FIG. 3 is a sectional view showing strips of resin slurry just deposited on a glass fibre layer, FIG. 4 is a view similar to FIG. 3 illustrating the flow of the slurry, FIG. 5 is a pictorial view of a part of the apparatus of FIG. 1 for feeding a covering film on to the impregnated layer, FIG. 8 is a side elevation similar to FIG. 1 illustrating a simplified method according to the invention for manufacturing glass fibre reinforced sheet material.

DESCRIPTION OF THE PREFERRED EMBODIMENT

Figure 6:
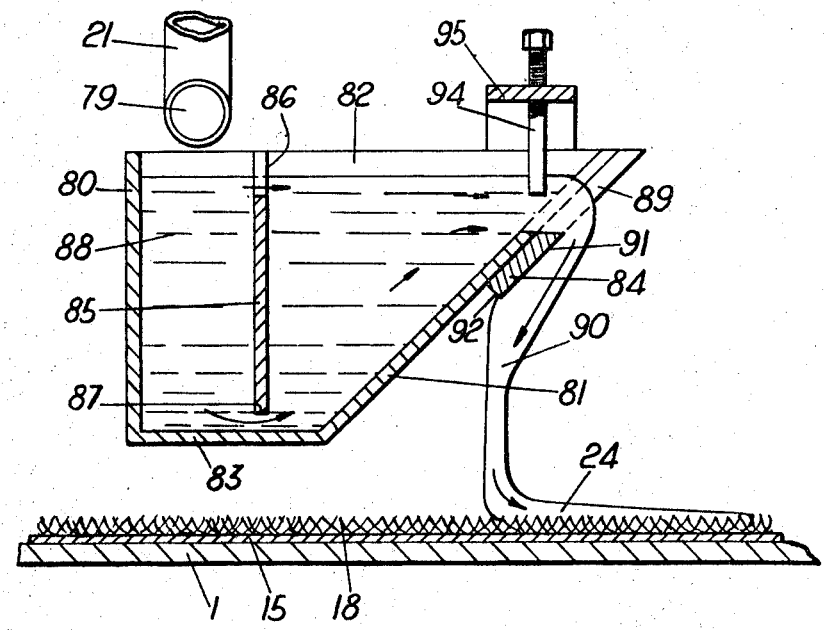
FIG. 6 is a section through the hopper shown in FIG. 1 for feeding bonding material on to the glass fibre layer.

In the drawings the same references indicate the same or similar parts.

Referring to FIG. 1 of the drawings an endless conveyor band 1 extends between driving rollers 2 and 3 respectively secured on shafts 4 and 5 which are rotatably supported in bearings, not shown, secured to a machine frame. The roller shaft 5 has a chain wheel 6 secured to it and an endless chain 7 passes over the chain wheel 6 and over a chain wheel 8 fixed to the output shaft 9 of a driving motor 10.

The upper reach of the band 1 which is travelling from left to right in the direction of the arrow 11 passes over a flat bed 12 on which that reach of the band is supported during the first part of its travel. A spindle 13 which is rotatably mounted in bearings not shown carries a roll 14 of a film material for example polyethylene film or a cellulose acetate film and this film material is unwound as indicated at 15 to form a travelling film which passes onto the upper reach of the conveyor band 1 and is carried by that band over the flat table 12. This travelling film is to constitute the backing sheet of the impregnated fibre material formed in the apparatus of FIG. 1. The conveyor band 1 carries the film beneath a fibre chopping and distributing apparatus which strews sheared strands of glass fibres onto the travelling film to form a uniformly distributed layer of glass fibres on the film. The chopping and distributing apparatus is indicated by the reference 16 and is an oscillating chopper distributor of the kind described and claimed in co-pending application Ser. No. 685,630, filed Nov. 24, 1967. Sheared strands of glass fibres indicated at 17 are projected from the chopper 16 and fall on to the film 15 to form the uniformly distributed layer indicated at 18 on the film. This layer is carried on the film beneath a hopper 19 which is disposed transversely of the path of the film 15 on the conveyor over the bed 12. The hopper is supplied with a flowable and mouldable bonding material to be described in greater detail below from a reservoir 20 which constitutes a mixing chamber to maintain the homogeneity of the bonding material and from which the material is delivered through an outlet 21 to a distributing inlet 22 mounted within the hopper.

The hopper has a plurality of spaced outlets constituted by flumes to be described in greater detail with reference to FIGS. 6 and 7 which channel individual streams 23 of the bonding material on to the fibrous layer 18, so as to deposit a plurality of strips 24 of the bonding material on the layer. As shown in FIG. 2 the strips 24 of bonding material are parallel strips which are spaced apart by a distance sufficient to ensure that the material of each strip sinks individually through the forwardly travelling fibrous layer 18. The bonding material as it is deposited on the top surface of the fibrous layer produces vermiform strips each of which gradually sinks through the layer. The form of the strips of bonding material deposited on the fibrous layer 18 is illustrated in FIG. 3 and the sinking of the bonding material through the fibrous layer begins immediately when the streams 23 are deposited on the layer. The distance between the strips 24 is such that there can be no contact of material from adjacent strips until the material from the strips has sunk individually through the fibre layer. This happens as the layer is further advanced by the conveyor and the material sinking individually through the forwardly travelling layer then spreads through the bottom of the layer when it reaches the travelling film 15 as illustrated in FIG. 4.

The strips are united at the bottom of the layer as indicated at 25 and as the material in the strips further sinks downwardly so the level of the material at 25 between adjacent strips tends to rise upwardly through the fibrous layer and as it rises flushes out of that layer any air trapped in the layer. There may be some tendency for the fibres between the strips to rise slightly as the level of the bonding material rises but this tendency is overcome in the final product by the rolling process to which the layer is ultimately subjected.

As the bonding material begins to impregnate the glass fibre layer in the manner illustrated in FIG. 4 the travelling film 15 carrying the layer is passed by the conveyor beneath a second chopper and distributor 26 which is identical with the chopper and distributor 16 and which strews sheared glass fibre strands indicated at 27 onto the top of the layer already carried on the film 15 so as to supplement the glass fibre content of the layer.

Just beyond the second chopper and distributor 26 there is mounted a roll 28 of a covering film material usually of the same kind as the film 15 which roll rotates on a spindle 29 which is rotatable in bearings fixed to the machine frame. The film material unrolled from the roll 28 is indicated at 30 and this film 30 passes beneath the roller 31 mounted above the end of the flat bed 12 and as illustrated in FIG. 5 the roller 31 is maintained by its bearings 32 at a height above the flat bed such that the film 30 passing beneath the roller 31 does not immediately contact the fibre layer travelling forwardly on the film 15. The gradual leading of the top covering film 30 beneath the roller 31 causes the film to gradually press down any glass fibres projecting upwardly from the top of the layer and also eliminates any trapping of air between the top covering film 30 and the fibre layer. Thereafter, the composite sandwich formed between the backing film 15 and the covering film 30 passes between pressure rollers 33 mounted beyond the end of the flat bed 12 and which are arranged to apply progressively increasing roller pressure to the composite sheet. Not only does this roller pressure cause the pressing of the top film firmly down onto the fibre layer but also causes the bonding material to complete its impregnation of the layer. Thus the bonding material between the strips will rise completely through the fibre layer and the supplementary fibres 27 deposited on top of the initial layer become completely incorporated in the impregnated layer. The rollers 33 gauge the layer as it passes between them so that the composite layer emerging from the rollers 33, which layer is indicated at 34 has a desired thickness.

In the embodiment illustrated in FIG. 1 the bonding material is a resin slurry composed mainly of an unsaturated polyester resin with additives including a livering agent which reacts with the resin in the slurry in such a manner as to cause a thickening of the slurry after the fibre layer is impregnated with the slurry. The livering agent thus causes a gradual ripening of the resin slurry as the sheet material 34 is advanced between the rollers 33 and beyond to give a flexible plastic material with a good shelf life and this material can be rolled into a roll as indicated at 35. The covering and backing films prevent the sheet material from sticking to itself in the roll and in this form the sheet material which is suitable for moulding under heat and pressure and which is commonly known in the trade as "prepreg" material can be stored and supplied to the customer in the form of rolls from which the moulder can cut a piece of the material for moulding under heat and pressure to give a glass fibre reinforced resin material.

In the embodiment illustrated in FIG. 1 strands of glass fibres are fed to the chopper distributors 16 and 26 from cakes of wound glass fibres 36 which are supported on spindles 37 in a creel indicated diagrammatically at 38. The strands of glass fibres being unwound from the cake 36 are indicated at 38 and 39. The fibres 38 are collected at a throat 40 forming an inlet to a guide duct 41 through which the strands are guided with assistance from compressed air supplied through a pipe 42 which assists in inducing the forward flow of the strands 38 through the guide duct 41 which terminates just behind the rollers of the chopper 16. Similarly the strands 39 are collected in a throat 43 supplied with compressed air through a pipe 44, which throat forms the inlet to a guide duct 45 through which the strands 39 are guided under the influence of the compressed air. The duct 45 ends just behind the nip of the rollers of the cutter 26.

The chopper distributor 16 is ilustrated in some detail in FIG. 2 and comprises a frame 46 which rotatably supports a chopper roller 47 and a backing roller 48. The chopper roller 47 has a plurality of blades 49 which are successively brought into pressure contact with the backing roller 48 at the nip of the rollers 47 and 48 as those rollers are rotated in opposite directions and thus sever the continuous glass fibre strands 38 fed from the duct 41 into the nip between the rollers into sheared short glass fibre lengths 17 for example, sheared strands of glass fibres 1½" long. The drive and operation of the cutter is described in greater detail in the above mentioned patent application.

The frame 46 is secured to one end of a beam 50 which is supported near its other end on a vertical pivot pin 51 and the beam 50 is angularly displaced about its pivot pin 51 by a slider bar 52 which presents a pin engaged in a slot 54 in the bar 50. The slider bar 52 lies transversely of the direction of movement of the travelling film 15 and the outer end of the bar 52 is formed with a head 55 which engages a profile cam 56 mounted on a shaft 57 which is rotated at constant speed by an electric motor 58 supported by an arm 59 secured to the machine frame indicated at 60.

The pivot pin 51 is secured to and is upstanding from a base plate 61 which is supported across the flat bed 12 by bridge members 62 and 63 secured to the machine frame 60. The base plate 61 also supports bearing blocks 64 and 65 in which the slider bar engages, and an anchor point 66 for a tension spring 67 which is connected to the end 68 of the bar 52 in order to maintain the slider bar 52 in engagement with the surface of the cam 56.

The profile of the cam 56 is such that the bar 50 is oscillated about its pivot pin 51 between two extreme positions which lie equidistantly on either side of vertical plane passing through the centre line of the travelling film 15 and the oscillating movement imparted by the cam is such that the sheared strands of glass fibres which are flying out of the nip between the rollers 47 and 48 are strewed across the travelling film 15 to give a uniform distribution of glass fibres in the layer 18 formed on the travelling film.

In one embodiment of the invention strands of glass fibres 38 are unwound from the creel at a rate of 350' per minute, there being twenty continuous strands 38 collected in the throat 40. The travelling film 15 is 36" wide and has a forward displacement of 36" per minute. The chopper chops the glass strands into 1.5" length which are uniformly distributed over the travelling film to form a uniform layer having a distribution of about 2.4 ounces of the glass fibres per square foot of the layer.

In order to assist in providing uniformity in the layer 18 side plates 68 and 69 illustrated in FIG. 2 are located on either side of the path of travel of the travelling film 15 and are vibrated by electrical vibrators 70 and 71. These vibrators are secured to the machine frame 60. The vibrating plates 68 and 69 serve to restrict distribution of fibres 17 falling from the chopper to the width of the film 15 and by vibration prevent build-up of fibres adjacent the margins of the film 15. The film 15 then carries the fibre layer between reciprocating ploughs 72 only one of which is shown in FIG. 2 which ploughs 72 are secured on bars 73 which are slidably supported by blocks 74 secured on the machine frame 60. The outer end of each of the bars 73 is pivotally connected to one end of an arm 75 which at its other end is rotatably connected to an eccentric pin 76 upstanding from a disc 77 which is rotated at constant speed by a motor 78 supported by a bracket 79 secured to the machine frame 60. As the film 15 carrying the fibre layer 18 passes between the reciprocating ploughs 72 the ploughs push the fibres inwardly to define clearly and limit the width of the fibre layer deposited on the film 15.

Figure 7:
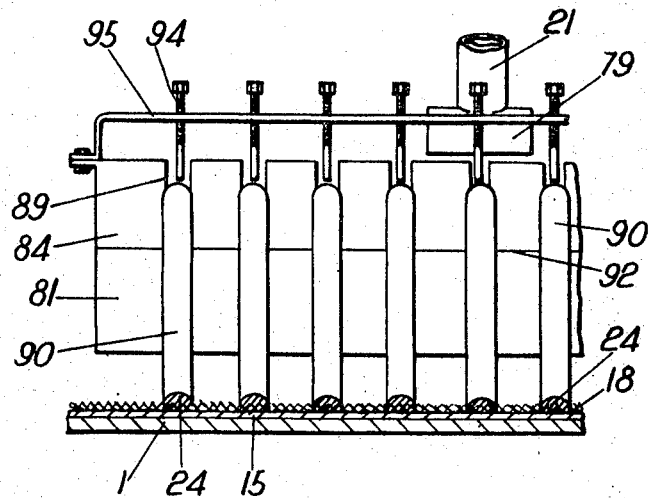
FIG. 7 is a front elevation of the hopper of FIG. 6.

The mixing reservoir 20 shown in FIG. 1 is continuously delivering a flowable resin slurry of the kind described above through a duct 21 which terminates in a T-ended outlet 79, FIG. 2 mounted just within the top of the hopper 19 which is illustrated in greater detail in FIGS. 6 and 7.

The hopper comprises a back wall 80 and an inclined front wall 81 connected together by integral end plates 82 and by a base plate 83. The angle of inclination of the wall 81 is 45° as illustrated in the drawings and a plate 84 is secured to the upper part of the outer face of the front wall 81. A baffle plate 85 is located in the hopper being secured to both end plates 82 and lying parallel to the back wall 80. The top edge of the baffle plate 85 is castellated as indicated at 86 and the lower edge 87 of the baffle plate is spaced above the bottom of the hopper.

The resin slurry continuously delivered from the mixing unit 20 through the T-ended outlet 79 discharges into the hopper between the back wall 80 and the baffle plate 64. The resin slurry 88 flows as indicated by arrows beneath the baffle plate and through the castellations in the upper edge of the baffle plate into the forward part of the hopper defined between the baffle plate and the inclined front wall 81. A substantially uniform level of the resin slurry is maintained in the forward part of the hopper. The upper edge of the front wall 81 and of its attached plate 84 is cut with spaced slots 89 forming flumes through which the resin slurry continuously flows. The spacing between the flumes 89 is such that the flow through each flume is in the form of an individual stream 90 of the resin slurry which flows down the inclined external face 91 of the plate 84 and falls from the lowermost corner 92 of that plate in the form of the individual stream onto the fibre layer 18 which is being advanced beneath the hopper of the film 15.

The hopper is mounted across the machine frame 60 by brackets 93 in such a way that the bottom of the hopper 83 lies just above the path of travel of the glass fibre layer and because of the inclination of the plate 81 and the relatively small fall of the resin slurry on to the glass fibre layer the streams of resin retain their individual form and are deposited onto the fibre layer in the form of the strips 24 spaced apart from each other and parallel to each other as described above. Preferably each of the flumes is ¼" wide and the spacing between the flumes is ½" so that the strips 24 deposited on the glass fibre layer are clearly separated and distinguished from each other.

In order to ensure uniformity in the individual streams flowing from the hopper each flume 89 is provided with an individual adjuster 94. The adjusters 94 are in the form of threaded bolts which are screwed into apertures in a bridge 95 extending across the top of the hopper and fixed to the side plates 82. Each of the adjuster bolts is vertically adjustable in the region of the inlet to its flume 89 so that the flow of resin through each of the flumes is individually adjustable.

With the construction of the hopper and the relative speed of advance of the layer of glass fibres it has been found advantageous to employ a resin slurry having a viscosity of about 30 poises. The rate of flow of the resin in the individual streams is such that the resin content of the eventual sheet material is of the order of 14 ounces per square foot and with the spacing of the strips about ½ an inch apart as they are formed on the glass fibre layer and with this viscosity of about 30 poises of the resin slurry the material of the strips gradually sinks through the glass fibres as they are advanced and eventually unites at the bottom of the fibre layer as illustrated in FIG. 4 prior to the completing of the impregnation of the fibres with the slurry by the application of roller pressure by the rollers 33. In this example with a glass fibre distribution of the order of 2.4 ounces per square foot and a resin slurry having a viscosity of about 30 poises it has been found that the slurry readily sinks through the glass fibres and there is no difficulty in achieving a thorough wetting of the fibres during the impregnation. In order to achieve a higher density of glass fibres in the ultimate sheet material, the supplementary glass fibre layer may then be distributed on top of the composite layer from the cutter 26 as illustrated in FIG. 1. The distribution of the second layer by the cutter 26 which corresponds in all essentials to the cutter 16 is such as to produce a supplementary deposit of glass fibres having a distribution of about 2 ounces per square foot. The covering sheet 30 is applied on top of this additional layer and as the resulting laminate passes between the pressure rollers 33 the additional fibres are forced into the fibres and resin already carried on the backing film 15 and complete wetting of the fibres is achieved during impregnation of the whole depth of the glass fibres resulting in a material which has a proportion of glass fibres of the order of 4.4 ounces per square foot with a resin distribution of 14 ounces per square foot.

By this method a higher density of glass fibres in a "prepreg" material is achieved than has been possible hitherto while retaining all the advantages of using sheared glass fibre strands in providing the glass fibre content for the material. Because of the rising of the bonding material upwardly through glass fibres which are not yet wetted by the bonding material air is excluded substantially from the glass fibres and the top film 30 being applied gradually on to the fibre layer excludes the possibility of air being trapped beneath the covering film. If desired however the top film may be perforated in order to permit escape of any trace of air which might be accidentally trapped.

If a lower proportion of glass fibres in the material is desired then the second cutter and distributor 26 may be omitted and the covering film 30 applied directly on top of the initial layer 18 when the strips of bonding material have united at the bottom of the layer in the manner illustrated in FIG. 4.

The invention may also be applied to the continuous production of glass fibre reinforced sheet material in which a layer of glass fibres is impregnated with a bonding resin and the impregnated layer is then passed through a curing oven to give a sheet of reinforced material which can be cut to size as desired. This embodiment of the invention is illustrated in FIG. 8. There is a single cutting distributor 16 which is fed with glass fibre strands in the manner illustrated in FIG. 1 to form a layer 18 on a travelling film 15 and thereafter a flowable thermosetting resin is flowed from the hopper in individual streams 23 in the same manner as described above to form strips of the resin which has a viscosity in the region of 30 poises on the surface of the glass fibre layer. Thereafter a top covering film 30 is pressed onto the layer of glass fibres to complete the impregnation of the fibres by the thermosetting resin and the laminate material is passed through a curing oven indicated at 96 in FIG. 8. A plurality of heaters 97 depend from the roof of the oven 96 and radiate heat downwardly on to the laminate as it is drawn over a table 98 on to which the laminate is delivered from the end of the conveyor band 1.

In this embodiment pressure is applied to the laminate by a pair of pressure rollers 99 prior to the delivery of the laminate from the conveyor belt and the cured glass fibre reinforced resin material in sheet form passes from the curing oven on the base table 98 to a pair of traction rollers 100 which withdraw the material through the oven. Thereafter the sheet material indicated at 101 is severed into individual sheets by means of a saw 102 in known manner.

In another modification of the invention the resin impregnated sheet may be moulded to a desired form in a continuous manner as it is advanced into and through the curing oven. For example corrugated glass fibre reinforced material which is usually of translucent quality for use as roof lights may be manufactured by passing the uncured composite material comprising the resin impregnated glass fibres between the films 15 and 30 over a former bed constituted by a base plate similar to the plate 98 which has the desired form to be imparted to the material. As the material is drawn over the former plate it sags into its corrugated form in known manner and is set in this form during its passage through the oven, the base plate after the initial forming stage being of uniform cross-sectional configuration corresponding to the desired corrugated formation to be imparted to the sheet material. Thereafter the cured glass fibre reinforced sheet is withdrawn by especially shaped rollers matching the corrugations in the sheet before being severed into lengths.

A more simple form may be imparted to the sheet for example a simple curved form by means of a former section of the base plate 98 which is of gradually increasing curvature imparting the desired curvature to the sheet and is followed by a part of uniform curvature which matches the desired formation to be given to the sheet and on which the advancing sheet is cured.

A suitable form of thermosetting resin in flowable form for application by the method of the invention is a flowable plastics mixture comprising:

|  | Percent |
| --- | --- |
| Polyester resin | 98.5 |
| Catalyst | 1.0 |
| Accelerator | 0.5 |

In the first embodiment described for the manufacture of "prepreg" material a suitable form of the homogeneous resin slurry has for example the following constituents:

|  | Percent |
| --- | --- |
| Polyester resin | 45 |
| Calcium carbonate filler | 50 |
| Tertiarybutylperbenzoate catalyst | 0.5 |
| Pigment | 3.5 |
| Magnesium oxide-livering agent | 1.0 |

The flowable and mouldable material delivered by the hopper may additionally comprise a thermoplastic resin and in all cases if desired the hopper and other parts of the apparatus may be provided with heating means for retaining the desired flowability of the streams delivered on to the glass fibre layer and for the strips formed on the glass fibre layer during the operation of the process.

The invention thus provides an improved impregnated glass fibre material in particular impregnated glass fibre sheet material suitable for moulding under heat and pressure comprising from 2.4 to 4.4 ounces per square foot of glass fibres uniformly distributed through a thickened resin slurry. When it is desired that the density of glass fibres shall be greater than about 2.4 ounces per square foot then the variation in density is achieved by varying the feed rate of shearing of the second chopper 26. For example the first chopper distributor may distribute sheared glass fibres at a density of 2.4 ounces per square foot while the second chopper deposits 1.6 ounces per square foot giving an overall distribution of glass fibres in the impregnated sheet material of the order of 4 ounces per square foot. This is normally achieved in a resin distribution of about 14 ounces per square foot and this corresponds in the case of a homogeneous resin slurry to a resin layer having a thickness of about 0.07" so that the final sheet material for storage and subsequent use in moulding has a thickness of about 0.07".

I claim:
1. A method of maunfacturing an impregnated fibre material in sheet form, the steps of uniformly distributing reinforcing fibres over a supporting surface to form a layer of fibres on the surface, effecting partial impregnation of the layer of fibres by depositing spaced bodies of flowable bonding material on the layer, the spacing between which bodies is sufficient to ensure that the material in each body flows individually downwardly through the layer and that the bodies are united by lateral flow at the bottom of the layer, and then causing the bonding material to flow through the layer between the bodies to complete the impregnation of the layer.

2. A method according to claim 1, including the steps of distributing the reinforcing fibres over a travelling film to form said layer on the film, channelling individual streams of the flowable bonding material on to the layer so as to deposit a plurality of strips of bonding material on this layer, which strips extend longitudinally of the layer and effect said partial impregnation of the layer, and subseqently causing the bonding material to flow through the layer between the strips to complete the impregnation of the layer.

3. A method according to claim 2, including supplementing the fibre content of the material by uniformly distributing further reinforcing fibres on the initial layer when the strips of bonding material have united across the bottom of the initial layer, and causing the bonding material to complete the impregnation of the whole depth of the fibres.

4. A method according to claim 2, wherein the fibres are uniformly distributed by strewing sheared strands of fibres.

5. A method according to claim 2, including applying progressively increasing roller pressure to the layer to cause the bonding material to flow through the fibres thereby completing the impregnation of the layer.

6. A method according to claim 5, including continuously rolling a covering film on to the upper surface of the impregnated fibre material.

7. A method according to claim 2, wherein the bonding material is a homogeneous resin slurry containing a livering agent and impregnation of the fibres is complete before adverse thickening of the slurry occurs.

8. A method according to claim 2, wherein the bonding material is a flowable thermosetting resin, and when impregnation of the fibres is complete the fibre impregnated material is cured during its further travel to form a fibre reinforced sheet material.

9. A method according to claim 2, wherein the reinforcing fibres are glass fibres.

10. A method according to claim 2, including the step of metering the quantity of bonding material deposited as each said strip on the layer.

References Cited

UNITED STATES PATENTS

| | | | |
|---|---|---|---|
| 2,771,387 | 11/1956 | Kleist et al. | 156—62.2X |
| 3,150,215 | 9/1964 | Houghton | 156—370X |
| 3,246,064 | 4/1966 | Moore et al. | 156—62.2X |
| 3,301,726 | 1/1967 | Matsukata | 156—62.2 |

BENJAMIN A. BORCHELT, Primary Examiner

J. J. DEVITT, Assistant Examiner

U.S. Cl. X.R.

156—369